United States Patent
Maerzinger et al.

(10) Patent No.: US 9,669,506 B2
(45) Date of Patent: Jun. 6, 2017

(54) MACHINE TOOL HAVING A MULTIPLICITY OF STATIONARY TOOL SPINDLES

(71) Applicant: Anger Machining GmbH, Traun (AT)

(72) Inventors: Martin Maerzinger, Kollerschlag (AT); Albert Zeilinger, Adlwang (AT)

(73) Assignee: Anger Machining GmbH, Traun (AT)

( * ) Notice: Subject to any disclaimer, the term of this patent is extended or adjusted under 35 U.S.C. 154(b) by 223 days.

(21) Appl. No.: 14/358,799

(22) PCT Filed: Oct. 18, 2012

(86) PCT No.: PCT/AT2012/050166
§ 371 (c)(1),
(2) Date: May 16, 2014

(87) PCT Pub. No.: WO2013/071325
PCT Pub. Date: May 23, 2013

(65) Prior Publication Data
US 2014/0304958 A1 Oct. 16, 2014

(30) Foreign Application Priority Data
Nov. 18, 2011 (AT) .................. A 1716/2011

(51) Int. Cl.
*B23Q 11/08* (2006.01)
*B23Q 39/02* (2006.01)
(Continued)

(52) U.S. Cl.
CPC .......... *B23Q 39/021* (2013.01); *B23Q 1/015* (2013.01); *B23Q 1/66* (2013.01); *B23Q 7/047* (2013.01);
(Continued)

(58) Field of Classification Search
CPC ............. Y10T 29/5196; Y10T 29/5124; Y10T 409/30532; Y10T 409/305432;
(Continued)

(56) References Cited

U.S. PATENT DOCUMENTS 4,673,076 A * 6/1987 Mattson ............... B23Q 7/1431
198/346.1
5,265,497 A * 11/1993 Curless .................... F16P 3/08
198/346.1
(Continued)

FOREIGN PATENT DOCUMENTS

AT 507 328 A2 4/2010
CH 654237 A5 * 2/1986
(Continued)

OTHER PUBLICATIONS

Machine Translation of CH 654237, which CH '237 was published Feb. 1986.*
(Continued)

*Primary Examiner* — Erica E Cadugan
(74) *Attorney, Agent, or Firm* — Collard & Roe, P.C.

(57) ABSTRACT

A machine tool has a multiplicity of stationary tool spindles that are optionally displaceable from a retracted rest position into an extended working position are positioned at various positions in a frame-like stand which defines and comprises machining space, and has a workpiece manipulator by way of which a workpiece support is movable multi-axially in translation and preferably also in rotation. In order to create advantageous loading conditions, it proposed that a loading door is associated with at least one of the leg walls defining the machining space, and that a workpiece support holder, which is equipped with a coupling for the workpiece support, is arranged on at least one, preferably on both, loading door panel fronts.

12 Claims, 5 Drawing Sheets

(51) Int. Cl.
  *B23Q 7/14* (2006.01)
  *B23Q 1/01* (2006.01)
  *B23C 1/10* (2006.01)
  *B23Q 1/66* (2006.01)
  *B23Q 7/04* (2006.01)
  *B23Q 11/00* (2006.01)

(52) U.S. Cl.
  CPC ........ *B23Q 7/1431* (2013.01); *B23Q 11/0891* (2013.01); *B23C 1/10* (2013.01); *B23Q 11/0053* (2013.01); *B23Q 11/0075* (2013.01); *B23Q 11/0078* (2013.01); *B23Q 39/025* (2013.01); *Y10T 29/5176* (2015.01); *Y10T 29/5196* (2015.01); *Y10T 409/30392* (2015.01); *Y10T 409/304032* (2015.01); *Y10T 409/304088* (2015.01); *Y10T 409/307168* (2015.01); *Y10T 409/308344* (2015.01); *Y10T 409/309576* (2015.01)

(58) Field of Classification Search
  CPC . Y10T 409/306048; Y10T 409/306104; Y10T 483/16; Y10T 483/165; Y10T 409/30392; B23Q 1/66; B23Q 7/02; B23Q 7/14–7/1494; B23Q 11/08–11/0891; B23Q 1/525; B23Q 1/527
  USPC .................. 29/33 P, 563; 198/345.3, 346.1; 483/14–15; 409/159, 161, 172, 173, 134
  See application file for complete search history.

(56) References Cited

U.S. PATENT DOCUMENTS

| | | | |
|---|---|---|---|
| 5,342,156 A | * | 8/1994 | Baba .................. B23Q 11/0891 408/710 |
| 6,176,656 B1 | * | 1/2001 | Seong ..................... B23Q 1/66 29/DIG. 56 |
| 7,192,225 B2 | | 3/2007 | Takayama et al. |
| 2008/0188363 A1 | | 8/2008 | Baumbusch et al. |

FOREIGN PATENT DOCUMENTS

| | | | |
|---|---|---|---|
| DE | 40 27 895 A1 | | 3/1992 |
| DE | 199 07 617 A1 | | 8/2000 |
| DE | 20 2004 015 097 U1 | | 9/2005 |
| DE | 10 2004 050 199 A1 | | 4/2006 |
| DE | 10 2005 015 214 A1 | | 10/2006 |
| DE | 10 2006 025 143 A1 | | 12/2006 |
| DE | 102006052933 B3 | * | 10/2007 |
| DE | 10 2006 048 495 A1 | | 4/2008 |
| DE | 20 2009 008 849 U1 | | 11/2010 |
| GB | 2271945 A | * | 5/1994 |
| JP | 2000-061755 A | | 2/2000 |
| WO | 97/10932 A1 | | 3/1997 |

OTHER PUBLICATIONS

Machine Translation of JP 2000-061755, which JP '755 was published Feb. 2000.*
International Search Report of PCT/AT2012/050166, mailed Apr. 15, 2013.

* cited by examiner

Rotary Drive for Pivoting the Loading Door

FIG. 5

Discharge Apparatus for Conveying Machining Chips Through the Opening in the Side Wall of the Frame, the Discharge Apparatus Including Slides and Blow-Out Nozzles

FIG. 6

MACHINE TOOL HAVING A MULTIPLICITY OF STATIONARY TOOL SPINDLES

CROSS REFERENCE TO RELATED APPLICATIONS

This application is the National Stage of PCT/AT2012/050166 filed on Oct. 18, 2012, which claims priority under 35 U.S.C. §119 of Austrian Application No. A 1716/2011 filed on Nov. 18, 2011, the disclosures of which are incorporated by reference. The international application under PCT article 21(2) was not published in English.

TECHNICAL FIELD

The invention relates to a machine tool having a multiplicity of stationary tool spindles that are displaceable, if necessary, from a retracted rest position into an extended working position and are positioned at various positions in a frame-like stand that defines and comprises a machining space, and having a workpiece manipulator, with which a workpiece support can be moved multi-axially in translation and preferably also in rotation.

STATE OF THE ART

With such known machine tools (WO 97/10932 A), the workpiece to be machined is fixed in place on the workpiece support of the workpiece manipulator, and passed to individual machining tools, for example drills, milling cutters, grinders or the like, one after the other, using the workpiece manipulator. In this connection, the machining tools are disposed on spindles fixed in place on the frame of the stand, whereby the spindles can be optionally displaceable between an extended working position and a retracted rest position, in order to prevent reciprocal interference of the spindles during machining, by means of spindles that are in the rest position at that time. These known machine tools are characterized, above all, by their efficient operation, which particularly results from the fact that no tool change times and no idle times have to be allowed to elapse during a machining procedure, because the machine tool accommodates the required tools in the different spindles, and the tools thereby do not have to be changed between individual machining procedures, and can already be started up before positioning of the workpiece from one spindle to another. By means of this measure, the non-productive times are minimized, and rapid machining of the workpieces is possible. Furthermore, multi-spindle parallel machining of multiple workpieces is possible on such apparatuses.

The workpiece can be moved on a carriage, usually with three axes of translation, using the workpiece manipulator, and furthermore can be rotated about at least one axis of rotation, in order to be able to guide the workpiece in desired manner with regard to the individual, stationary machining tools, and to be able to mill or drill or grind even complex tracks. A particular disadvantage inherent in these known machine tools is that for loading, separate loading manipulators disposed on the front side of the apparatus must generally be provided, which remove the finished workpieces from the machining space, together with the workpiece support that can be connected with the workpiece manipulator by way of a releasable coupling, and transfer blanks clamped onto workpiece supports to the workpiece manipulator. This is disadvantageous also because apparatuses for loading are provided in regions that must be accessible for maintenance.

In order to be able to also machine two workpieces at the same time, for example, using such known machine tools, it is known (DE 10 2004 050 199 A1) to provide a working space in which at least two workpiece manipulators are disposed. In this connection, both workpiece manipulators are connected with displacement devices, so that they can be moved, at least two-dimensionally, in the working space. These displacement devices establish displacement regions that lie in the working space and can be established separately from one another. In this way, different machining procedures, such as, for example, grinding, honing, pressing in bushings or the like can be undertaken in equal measure in one machine. In this connection, the increased machine tool expenditure for the event that a significant number of machining tools must be provided is once again disadvantageous.

Working spaces of machine tools for closing and the working spaces by way of loading doors for loading are known from a plurality of documents. For example, DE 20 2009 008 849 U1, DE 10 2006 025 143 A1, and DE 20 2004 015 097 U1 should be mentioned here. In the case of the last two documents, the loading door is assigned to a side wall of the machine frame.

PRESENTATION OF THE INVENTION

Proceeding from the state of the art of the type described initially, the invention is based on the task of creating a new machine concept for a machine tool, which allows advantageous loading of the machine tool with workpieces, at the shortest possible machining and loading times, in other words minimized non-productive times.

The invention accomplishes this task in that a loading door belongs to at least one of the side walls that defines the machining space, and that a workpiece support holder, which is equipped with a coupling for the workpiece support, is disposed on at least one, preferably on both loading door panel fronts.

With such a design, advantageous loading of the machine tool is possible, as compared with the state of the art, particularly because loading no longer has to take place from the machine tool front, which after all must also be accessible particularly for inspection purposes and maintenance purposes, but rather now more from a machine side, in other words from a region that is usually freely and easily accessible. This loading door is closed during machining, for reasons of work safety technology, and is opened only for loading. Loading can take place using a conventional robot, a conveyor belt, a transfer station or the like.

According to the invention, a workpiece support holder, which is equipped with a coupling for the workpiece support, is disposed on at least one, preferably on both loading door panel fronts. According to the invention, the loading door itself thereby forms the transfer device or a significant part of the transfer device. Thus, a workpiece disposed on the workpiece support holder is transferred from the machining space into a loading space or, vice versa, from the loading space into the machining space, by means of pivoting the door. For this purpose, the workpiece is attached, for example with the workpiece support, on the workpiece support holder, in the loading space, and subsequently transferred into the machining space by means of pivoting the door, where the workpiece manipulator takes over the workpiece support with the workpiece. For this purpose, the workpiece support holder and the workpiece support must be equipped with corresponding couplings. The workpiece support thus has two couplings, for example, one for the workpiece support holder and a further one for the workpiece manipulator.

If it is always supposed to be possible to machine two or more workplaces at the same time, using the workpiece manipulator or using the workpiece machine according to the invention, it is recommended that at least two workpiece support holders are disposed on each loading door panel front, the coupling surfaces of which, interacting with the workplace support, lie in one plane. The loading door that serves as a loading device thus carries two, if necessary even more workpiece support holders per loading door panel front, in each instance, which can be displaced jointly between the loading position and the machining position, using the loading door. Because of the fact that the coupling surfaces that interact with the workplace support lie in one plane, it is guaranteed, at least in the case of identical workpiece supports, that the couplings for a workpiece manipulator lie in one plane, and that the latter can accommodate and couple the two workpiece supports, so to speak, after which the workpiece support holder coupling is released, and the workpieces, with the workpiece supports, can be passed to the tools, in each instance, by the manipulator.

In this connection, if the loading door is mounted in the side wall so as to pivot about an axis that lies in its plane of symmetry, preferably a horizontal axis, using a rotary drive, machined workpieces, in particular, can be freed of chips and/or cooling lubricant when the loading door is pivoted. Furthermore, the possibility exists that the loading door is mounted in the side wall so as to pivot preferably by at least 180°, if necessary also by more than 360°, using a rotary drive. In this way, workpieces can be transferred to the workpiece manipulator in the loading space, so to speak, and, at the same time, workpieces that have already been produced can be exchanged for workpiece blanks in the loading space, thereby once again significantly reducing the non-productive times. If the at least one workpiece support holder is furthermore disposed on the loading door in such a manner that it is disposed lower in the loading position than in the transfer position, for ergonomic reasons, then significant advantages occur, particularly for manual loading of the machine. Furthermore, chips and the like that accumulate in the workpiece during machining can be emptied out when the loading door is pivoted from the transfer position, in other words out of the machining space, into the loading position (in the loading space), for which purpose a suitable collection container, in particular, can be provided in the loading space. For this purpose, the loading door, as such, is particularly point-symmetrical about its pivot axis. This means that such point mirroring corresponds to rotation of half the door, divided by the axis of rotation, by 180°, whereby the axis of rotation is that point for the point mirroring that represents the door inside and the door outside on itself. It is obvious that the door can be correspondingly sealed at the transition to the door frame.

In order to not have to accept the possibility of danger to persons when pivoting the loading door, using the rotary drive, from a loading position into a transfer position, the loading door can have a loading lock assigned to it on the outside, which lock has a further door, if necessary. This loading lock can also be equipped, on the outside, with a roller curtain or with another suitable means for securing the loading lock, which is accessible only when the loading door is disabled, or, to put it differently, whereby the loading door can be pivoted only when the loading lock is closed.

According to a further embodiment variant of the invention, the machine tool is equipped with discharge apparatuses for machining chips on the machining space side, which convey machining chips through the at least partially open loading door, if necessary. These can be slides or blow-out nozzles, for example, which can be activated when the loading door is open, and discharge accumulated chips through the loading door.

For the purpose of reducing the non-productive times, it can furthermore be advantageous if at least one of the tool spindles has a tool magazine plus tool changer assigned to it. Such a tool changer, particularly one to be provided on an apparatus according to the invention, is described in detail in AT 507 328 A.

BRIEF DESCRIPTION OF THE DRAWING

In the drawing, the invention is shown schematically using an exemplary embodiment. The figures show:

FIG. 6 a schematic representation of a discharge apparatus for conveying machining chips through an opening in the side wall of the frame.

WAY TO IMPLEMENT THE INVENTION

Figure 1:
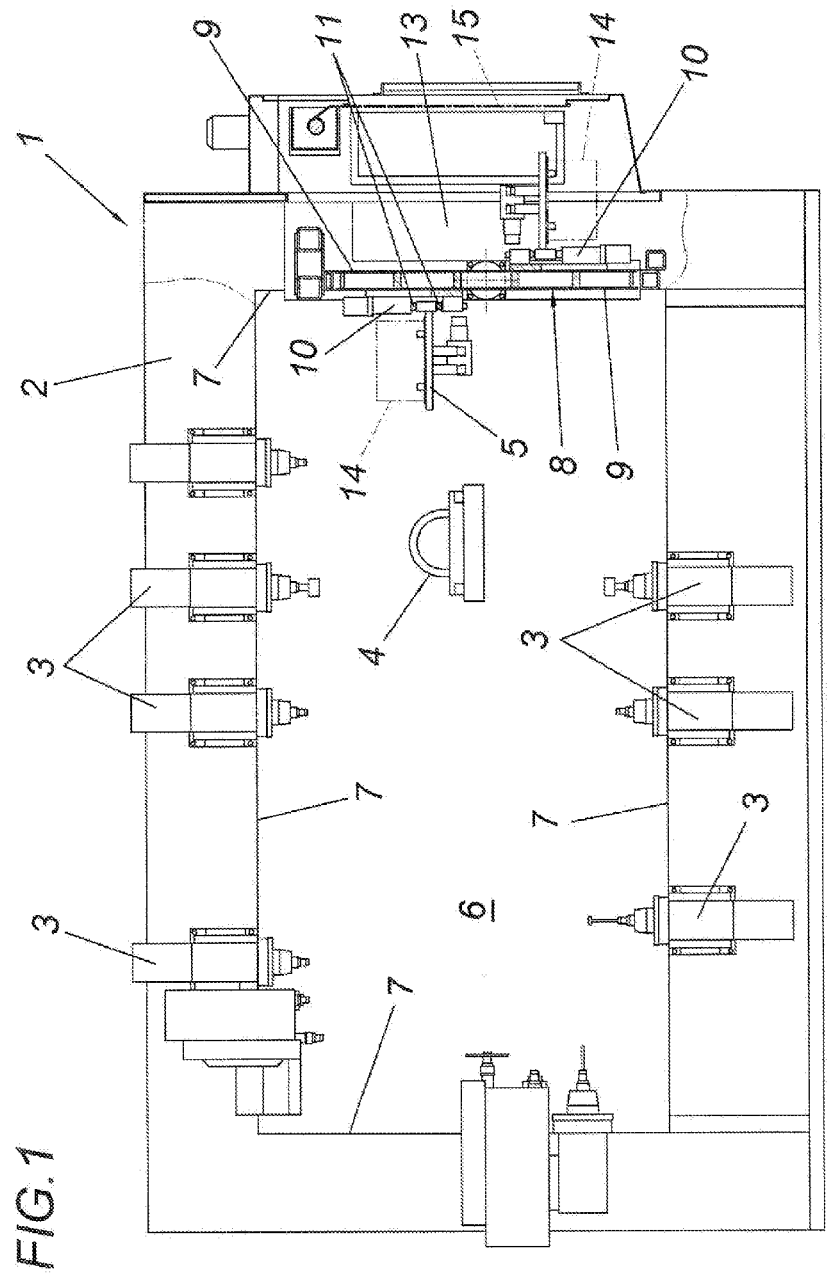
FIG. 1 a machine tool according to the invention, in a front view, in partial section, FIG. 2 a lateral side wall of the apparatus from FIG. 1, with a loading door according to the invention, in an enlarged view at a slant, FIG. 3 the loading door from FIG. 1 in cross-section, partly in section, FIG. 4 the loading door from FIG. 3 in section along the line IV-IV from FIG. 3, FIG. 5 a schematic representation of the rotary drive for pivoting the loading door.
Figure 2:
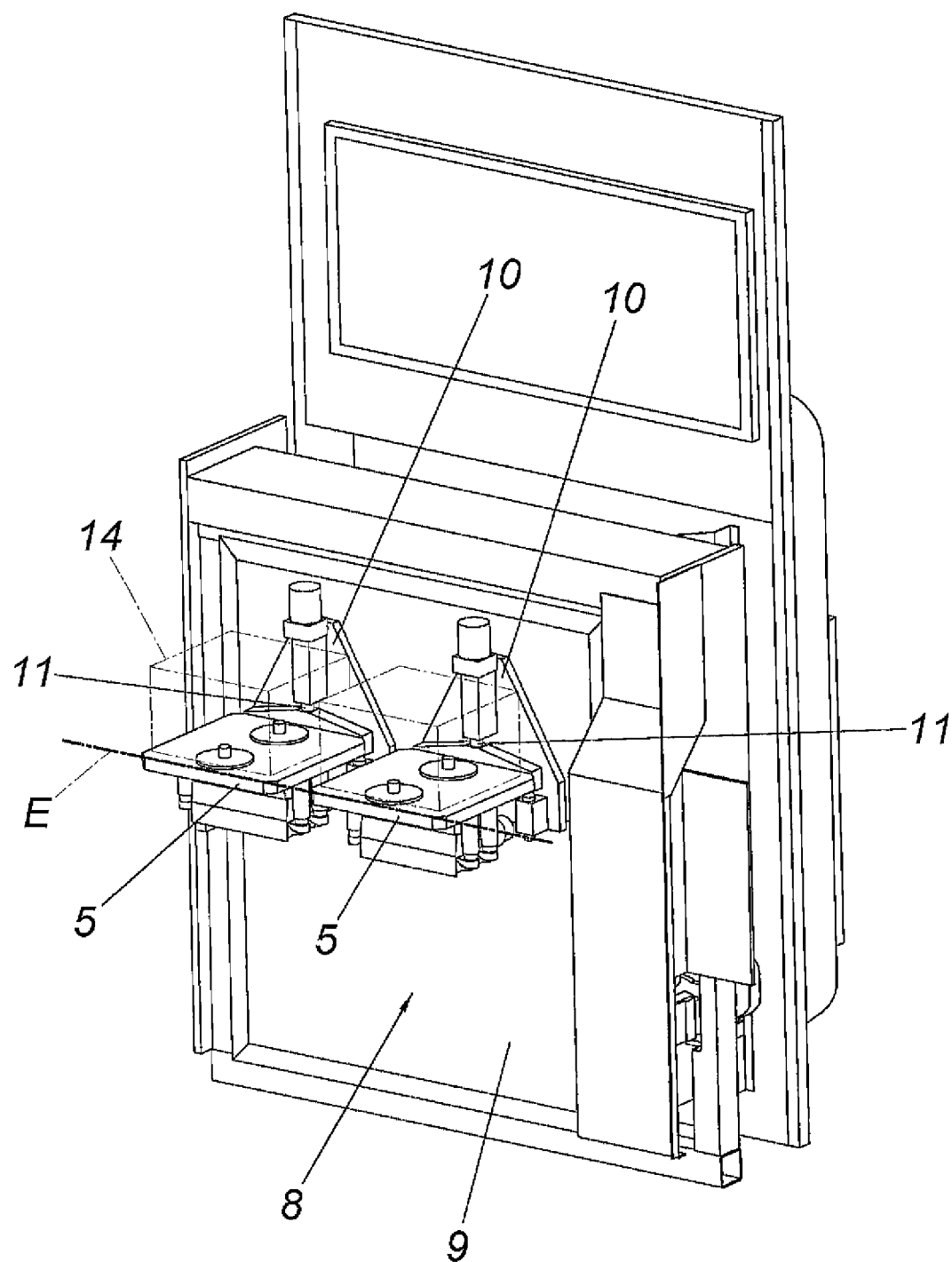

A machine tool 1 is equipped with a multiplicity of stationary tool spindles 3 that are displaceable, if necessary, from a retracted rest position into an extended working position and are positioned at various positions in a frame-like stand 2, and with a workpiece manipulator 4, with which a workpiece support 5 can be moved multi-axially in translation and preferably also in rotation. The frame-like stand defines a machining space 6, which machining space 6 is enclosed by the frame-like stand 2. The frame-like stand particularly comprises four side walls 7, whereby in the exemplary embodiment shown, tool spindles 3 are assigned to three side walls 7.

According to the invention, one side wall, namely the right side wall 7, has a loading door 8 assigned to it.

Figure 3:
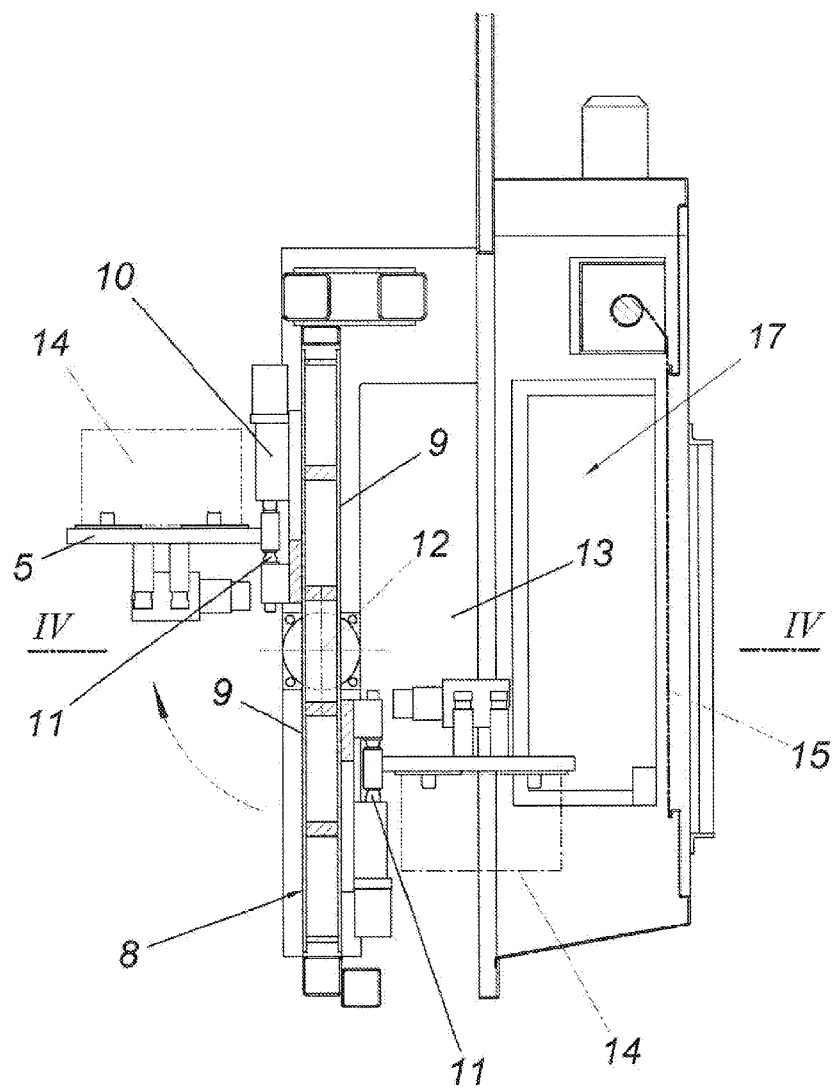
Figure 4:
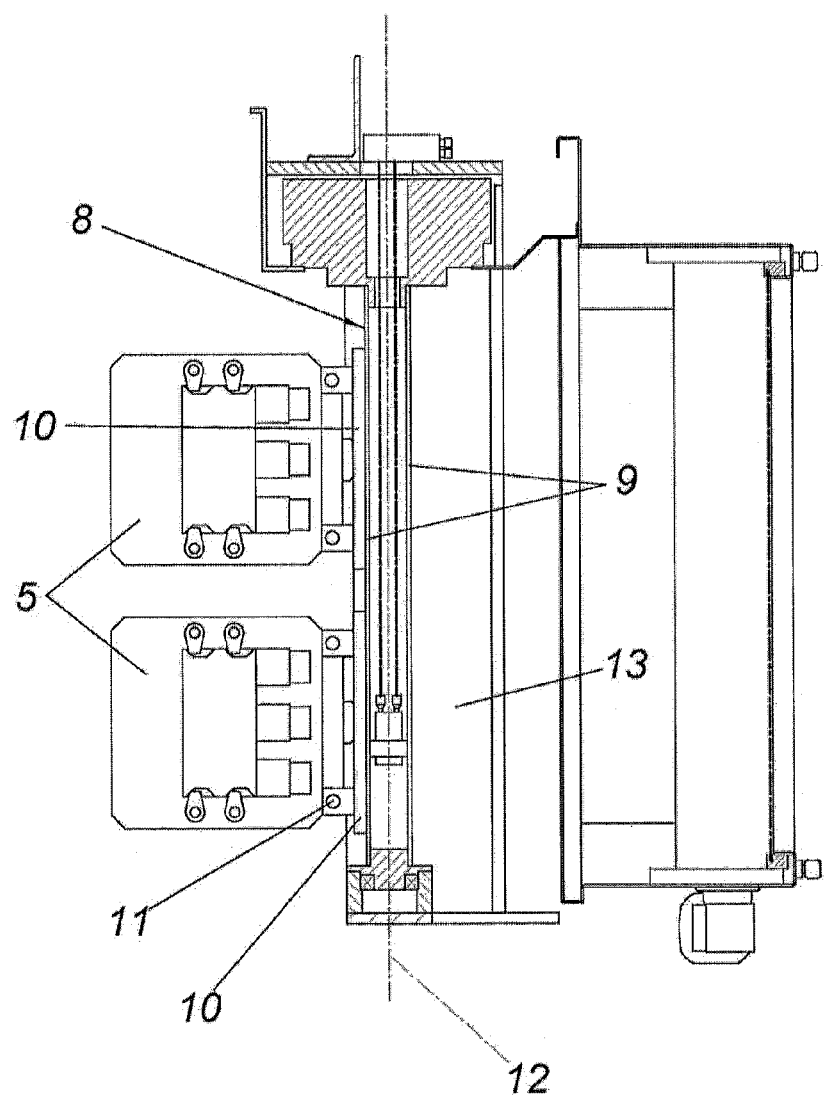

As can be derived from the exemplary embodiments, workpiece support holders 10 are assigned to both loading door panel fronts 9, which holders are equipped with a coupling 11 for the workpiece support 5. In this connection, two workpiece support holders 10 are disposed on each door loading panel front 9, the coupling surfaces of which holders, interacting with the workpiece support 5, lie in a common plane E. Furthermore, the loading door 8 is mounted in the side wall 7 so as to pivot about a horizontal axis 12 that lies in its plane of symmetry, using a rotary drive that is indicated in FIG. 5. With this rotary drive, the loading door 8 is mounted in the side wall 7 so as to pivot by at least 180°. In particular, the loading door 8 as such is symmetrical about the pivot axis 12. As can be derived from FIGS. 1 and 3, the loading door 8 can be pivoted out of a loading position, out of the loading space 13, into a transfer position, in which a workpiece 14 is disposed in the machining space 6, using the rotary drive. Thus, at the same time, a workpiece support 5 with workpiece 14 can be transferred to the workpiece manipulator 4, and a new workpiece can be disposed on the workpiece support holder 10 in the loading space 13, or can be clamped onto the holder. The fact that the loading space 13 forms a kind of loading lock 17 can be derived from FIGS. 3 and 4, for example. For this purpose, as shown in FIG. 1, a further door 15, in the exemplary embodiment shown a roller curtain, is provided on the outside of the loading door 8. Activation of the loading door 8 is only possible when the curtain is closed.

The invention claimed is:

1. Machine tool (1) comprising:
 a tool spindle (3) that is positioned in a stand (2) that defines and delimits a machining space (6),
 a workpiece manipulator (4) within the machining space (6), for supporting a workpiece and workpiece support (5) while the workpiece is machined by the tool spindle (3), with which workpiece manipulator (4) the workpiece and workpiece support (5) can be moved relative to the tool spindle,
 wherein the stand (2) includes a plurality of side walls (7) that delimit the machining space (6), the plurality of side walls including a side wall that has an opening therethrough, wherein a loading door (8) having two opposed side panels (9) is provided so as to pivot about a horizontal pivot axis (12) to open and close the opening, and
 wherein a respective workpiece support holder (10), which is equipped with a respective coupling (11) for coupling to a respective workpiece support (5), is disposed on both of the loading door side panels (9) such that when the opening is closed by the loading door (8), one of the workpiece support holders (10) and its respective workpiece support (5) is located at a transfer position within the machining space (6) while the other of the workpiece support holders (10) and its respective workpiece support (5) is located at a loading position outside the machining space (6), and such that pivoting of the loading door (8) about the horizontal axis (12) is configured to move the one workpiece support holder (10) and its respective workpiece support (5) to said loading position and to move said other of the workpiece support holders (10) and its respective workpiece support (5) to said transfer position; and
 wherein, from said transfer position, a given one of the workpiece supports (5) and its corresponding workpiece are transferred from the corresponding respective workpiece support holder (10) to the workpiece manipulator (4), for the machining of the corresponding workpiece by the tool spindle (3).

2. Machine tool according to claim 1, wherein a respective additional workpiece support holder (10) is disposed on each of the two loading door side panels (9).

3. Machine tool according to claim 1, wherein the loading door (8) is mounted in the side wall (7) having the opening so as to pivot about the horizontal axis (12), wherein the horizontal pivot axis lies in a plane of symmetry of the loading door (8), and wherein machined workpieces (14) can be freed of chips and/or cooling lubricant when the loading door (8) is pivoted.

4. Machine tool according to claim 1, wherein each of the workpiece support holders (10) are disposed on the loading door (8) in such a manner that each workpiece support holder is disposed lower when in the loading position than when in the transfer position.

5. Machine tool according to claim 1, wherein the loading door (8) is mounted in the side wall (7) so as to pivot by at least 180°, using a rotary drive.

6. Machine tool according to claim 1, wherein the loading door (8) is point-symmetrical about the horizontal pivot axis (12).

7. Machine tool according to claim 1, wherein the loading door (8) can be pivoted from the loading position into the transfer position, using a rotary drive.

8. Machine tool according to claim 1, wherein a further door (15) is provided, and wherein the loading door (8) can only be pivoted when the further door is closed.

9. Machine tool according to claim 1, wherein a respective additional workpiece support holder (10) is disposed on each of the two loading door side panels (9), wherein each of the workpiece support holders (10) includes a respective coupling surface for interacting with a corresponding one of the workpiece supports (5), and wherein for the two workpiece support holders (10) that are disposed on one of the side panels (9), the coupling surfaces of those two workpiece support holders (10) lie in a common plane (E).

10. Machine tool according to claim 1, further comprising additional tool spindles.

11. Machine tool according claim 1, wherein the workpiece manipulator (4) can move a workpiece support (5) held thereby multi-axially in translation and also in rotation.

12. Machine tool according to claim 1, further comprising a rotary drive for pivoting the loading door (8) about the horizontal axis.

* * * * *